Patented May 12, 1942

2,282,801

UNITED STATES PATENT OFFICE 2,282,801

STABILIZATION OF FRUITS AND VEGETABLES

Sidney Musher, New York, N. Y., assignor to Musher Foundation Incorporated, New York, N. Y., a corporation of New York No Drawing. Application April 23, 1940, Serial No. 331,180

6 Claims. (Cl. 99—154)

The present invention relates to the stabilization of fruits and vegetables, particularly in substantially dehydrated condition, against oxidative deterioration, discoloration and loss of vitamins.

In accordance with the present invention, the fruits and vegetables are treated with a relatively small amount, such as from 0.5% to 5% on their solids weight basis of desugared milk-solids-not-fat, preferably whey, and desirably in substantially caramelized condition.

The whey that is particularly utilized in accordance with the present invention is obtained from the manufacture of cheese and is the material drained off after the cheese has been curdled with rennet, for example, and after the curd has been formed to the proper degree of hardness. Of particular importance for use is the whey that is obtained from the manufacture of cottage cheese whereby coagulation is effected by natural souring and the liquid has been heated nearly to boiling.

The whey is then further treated in order to remove a portion of the lactose, the lactose being allowed to crystallize out, and the whey that is utilized in accordance with the present invention will contain about 25% to 40% less lactose than originally present in the whey.

The whey is substantially free of casein and of fat and will contain about 35% to 45% of protein, almost entirely in the form of albumin, and about 13% to 17% total ash.

Apparently in the production of the whey and in the subsequent removal of a portion of the lactose, antioxygenic action is materially enhanced.

It has been found particularly desirable to subject the whey while in a substantially aqueous dispersion and containing less than about 50% total solids, to a temperature of at least 220° F. and preferably 235° F. to 245° F. for about 15 to 30 minutes or more at some stage in its processing. Under these conditions, the whey becomes caramelized and this caramelization process is important in order to enhance the antioxygenic effect of the whey. Unless the whey has been subjected to this caramelization step, the most desirable results of the present invention are not obtained.

Desirably, the whey is adjusted to a pH of between 4 and 6.7 and preferably to a pH of 5.5 to 6 before subjecting it to caramelization.

The pH adjustment may be made by the use of citric acid, tartaric acid, malic acid, acetic acid, hydrochloric acid, or phosphoric acid.

Following the caramelization of the slightly acidified whey, the whey may thereupon be neutralized as by the use of bicarbonate of soda or similar neutralizing agent to a pH of about 6.4 to 6.8 before subjecting to further dehydration or drying.

For example, whey may be concentrated to approximately 20% total solids and the whey may then be heated to a temperature of between 235° F. to 245° F. for a period of from 30 minutes to 1 hour, desirably at a pH of about 6.0. The caramelized whey may then be further concentrated to about 50% total solids or completely dehydrated and is ready for use in accordance with the present invention.

The whey, desirably in caramelized condition, is applied to the fruit or vegetable, and the fruit or vegetable is then subjected to an elevated temperature of at least about 220° F. in order to further enhance the antioxygenic effect. This elevated temperature to which the fruit or vegetable is heated with the whey is important in order to obtain the fully desirable enhanced results of the present invention.

The higher the temperature to which the fruit or vegetable is subjected after or during treatment with the whey, the greater the stabilizing effect that is obtained. This heat treatment may be as high as between 300° F. and 400° F.

It is desirable for the fruit or vegetable to be treated with the whey in substantially aqueous condition and preferably containing not more than about 20% to 30% total solids.

Where the whey is first obtained in substantially dehydrated or dried form, as, for example, after the whey has been caramelized and completely dried, the whey is desirably then diluted with water or similar aqueous material to about 10% to 20% total solids and the fruit or vegetable is then treated with the substantially dilute aqueous dispersion of the whey, preferably in caramelized condition.

In the case of those fruits and vegetables which are first substantially macerated or finely ground or otherwise finely divided before treated, the whey may be added to the macerated fruit or vegetable and thoroughly admixed with it and desirably thereupon subjected to the elevated temperature treatment of at least about 220° F. either following or incidental to the drying of the whey, followed, where desired, by drying, preferably at over 220° F.

Where substantially caramelized whey is employed, it is not so important that the fruit or vegetable be treated with the whey at 220° F. or more, although this additional heat treatment is desirable. Where, however, the whey has not been subjected to caramelization in its preparation, the heat treatment with the fruit or vegetable preferably at the time of dehydration is important.

Where the fruit or vegetable is retained in its substantially whole condition, it may be dipped into a boiling whey suspension, for example, such as where an aqueous solution containing between 10% and 20% of whey solids is held at a temperature of about 200° F. to 210° F. or more and the fruit or vegetable immersed into that solution for a momentary period or up to about 1 minute or more. After removal from the substantially boiling aqueous dispersion of the whey, the fruit or vegetable may thereupon be further processed as by drying or canning and it will be found that the fruit or vegetable is substantially stabilized against oxidative deterioration.

Among the various fruit products that may be treated in accordance with the present invention are included apricots, figs, prunes, cherries, strawberries, apples, citrus fruits, cranberries and peaches.

These various fruits may either be treated by immersing into a boiling solution of the whey, desirably in caramelized condition, or they may also be immersed into a cold whey solution or otherwise treated with the whey and then subjected to an elevated temperature treatment of at least about 220° F.

The high temperature treatment of 200° F. or more may be carried out during dehydration of the fruit and the fruit may be subjected to drying desirably under pressure and at the elevated temperature in order to produce the enhanced stabilizing and antioxygenic effect.

The fruits thus obtained and which are substantially devoid of fat or glyceride oils will retain their original flavor and color without change over long periods of time and will not develop the characteristic off-odor, off-flavor, and off-color which appear to be due to oxidation.

For example, whole strawberries may be immersed into a boiling solution containing about 10% to 20% of whey, desirably in caramelized condition, and the strawberries may be permitted to remain in the hot or boiling liquid for 1 to 10 minutes with or without additional concentration of the liquor by evaporation of the water. The strawberries may then be removed and dehydrated.

Among the vegetables which may similarly be treated are peas, beans, carrots, tomatoes, spinach, asparagus and broccoli. These vegetables are either immersed into the boiling whey solution in the manner indicated above or the boiling whey solution may be sprayed upon the fruits or vegetables, and the fruits or vegetables then subjected to the elevated temperature treatment.

Where the fruits or vegetables are sprayed with the antioxygenic whey solution, desirably in carmelized condition, the spraying may be done at below 212° F. and the fruits or vegetables may subsequently be subjected to an elevated temperature treatment of at least about 220° F. in order to produce the enhanced antioxygenic effect.

Other materials such as walnuts, almonds, pecans soya beans, wheat germ, sesame seeds, olives and other oxidizable food compositions may also be similarly treated. In the treatment of the grasses, such as alfalfa, as well as in the treatment of these other foods, it is important that the whey be applied in substantially caramelized condition and also desirable that following addition of the whey, the food products be treated at an elevated temperature of at least about 220° F. in order to produce the desirable antioxygenic effect.

As indicated above, where the whey has not been subjected to caramelization, following treatment with the fruit or vegetable, it is important that the fruit or vegetable be subjected to a temperature of at least 220° F. to produce the desirable results of the present invention.

In the case of the high water containing vegetables, such as carrots, the carrots are preferably macerated to form an aqueous mass. To that mass there is added and thoroughly admixed therewith the whey, desirably in caramelized condition. The carrots containing a small amount, less than 5% and desirably less than 2%, of the whey are then subjected to an elevated temperature of at least about 220° F. during which the carrots may be further dehydrated or dried.

Where it is desired to treat carrots in their whole form, such carrots may be immersed in a boiling solution of the whey so as to coat them with sufficient of the whey mixture and then subjected to an elevated temperature treatment of at least about 220° F. or to dehydration at over 220° F.

In the case of fruits, such as peaches, strawberries, pineapple, pears, etc., where those fruits are subjected to a brining operation, a small amount of the whey may be present in the brine, the whey being preferably in caramelized condition.

About 5% to 25% of the whey solids may be used against the total weight of the salt.

When such fruit or vegetable is subjected to an elevated temperature treatment or when it is dried or canned, there will be obtained not only a retardation of oxidation but also a retardation of the loss of both carotene and vitamin C.

Low moisture containing vegetables may also be sprayed with an aqueous suspension of the whey and then subjected to an elevated temperature treatment of at least about 220° F.

The various grasses such as alfalfa, corn grass, timothy grass, maize grass, spring vetch, red clover, sorghum grass and other grasses may similarly be treated with caramelized desugared whey. The treatment of these various grasses include both the forage or green fodder legumes as well as the forage grasses.

Although whey, desirably in caramelized condition, is preferred, aqueous dispersions of other milk solids may also be employed including particularly buttermilk where at least a portion of the lactose has been converted to lactic acid. There may also be utilized evaporated buttermilk, condensed or semi-solid buttermilk, skim milk, whole milk, whey residue or other similar forms of milk solids not fat.

As indicated above, these various milk solids are preferably caramelized before being utilized in accordance with the present invention. Although they may be concentrated, or made available in dried condition, they are desirably utilized in substantially aqueous condition and containing not more than about 20% to 30% total solids.

Green or ripe olives may similarly be treated by immersing them in the whey or the milk solids solution.

In addition to treating fruits and vegetables in accordance with the present invention, there may also be treated meat products such as particularly bacon, pork loins, hog fat backs, salt pork, loin trimmings of beef, corned beef, mutton and poultry including particularly fatty ducks, geese, chickens and turkeys, fatty fish such as herring, salmon, sardines, tuna fish, mackerel, white fish and menhaden, which products may be treated in their substantially smoked, salted, cured or fresh condition.

The fatty meats or fish may be immersed into the boiling whey solution or surfaced with the whey and then subjected to an elvated temperature treatment as by applying direct flame thereto desirably at a temperature between about 300° F. and 400° F. in order to obtain enhanced stabilization against rancidity.

There may also be employed the alcohol soluble extracts of the whey, or similar milk solids, preferably desugared.

For example, whey may be extracted with methyl, ethyl, butyl or propyl alcohol at a temperature slightly over room temperature and, following removal of the solvent therefrom, the extract may be combined with additional whey or utilized in lieu of the whey of the present invention.

The present application is a continuation in part of application, Serial No. 239,319, filed November 7, 1938, now Patent 2,198,215.

Having described my invention, what I claim is:

1. A process of stabilizing materials selected from the group consisting of fruits and vegetables against oxidative deterioration, which comprises treating them with a relatively small amount of caramelized milk-solids-not-fat.

2. A process of stabilizing materials selected from the group consisting of fruits and vegetables against oxidative deterioration, which comprises treating them with a relatively small amount of caramelized whey at a temperature of at least 220° F.

3. A process of stabilizing materials selected from the group consisting of fruits and vegetables against oxidative deterioration, which comprises treating them with a relatively small amount of caramelized milk-solids-not-fat and then drying.

4. A process of stabilizing fruits against oxidative deterioration which comprises treating them with a relatively small amount of caramelized milk-solids-not-fat.

5. A substantially stabilized product stabilized against oxidative deterioration, said product composed of a material selected from the group consisting of fruits and vegetables carrying and being stabilized by a coating of caramelized milk-solids-not-fat.

6. A substantially stabilized product stabilized against oxidative deterioration, said product composed of a material selected from the group consisting of fruits and vegetables carrying and being stabilized by a coating of caramelized whey.

SIDNEY MUSHER.